(12) United States Patent
Nagase

(10) Patent No.: US 11,312,182 B2
(45) Date of Patent: Apr. 26, 2022

(54) TYRE

(71) Applicant: Sumitomo Rubber Industries, Ltd., Kobe (JP)

(72) Inventor: Hiroki Nagase, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 364 days.

(21) Appl. No.: 16/360,846

(22) Filed: Mar. 21, 2019

(65) Prior Publication Data

US 2019/0308463 A1 Oct. 10, 2019

(30) Foreign Application Priority Data

Apr. 6, 2018 (JP) .............................. JP2018-074056

(51) Int. Cl.
*B60C 11/03* (2006.01)
*B60C 11/12* (2006.01)
*B60C 11/13* (2006.01)

(52) U.S. Cl.
CPC ...... *B60C 11/0304* (2013.01); *B60C 11/0306* (2013.01); *B60C 11/0309* (2013.01); *B60C 11/0311* (2013.01); *B60C 11/1204* (2013.01); *B60C 11/1236* (2013.01); *B60C 11/1263* (2013.01); *B60C 11/13* (2013.01);
(Continued)

(58) Field of Classification Search
CPC ............. B60C 11/0304; B60C 11/1236; B60C 11/1263; B60C 11/1204; B60C 11/12; B60C 11/03; B60C 2011/0367; B60C 2011/0369; B60C 2011/0381; B60C 2011/0372
See application file for complete search history.

(56) References Cited

U.S. PATENT DOCUMENTS 5,435,366 A * 7/1995 Voigt ................. B60C 11/0302
152/209.18
D472,517 S 4/2003 Hutz et al.
(Continued)

FOREIGN PATENT DOCUMENTS

EP 1829712 A1 9/2007
EP 2055505 A1 5/2009
(Continued)

OTHER PUBLICATIONS

JP 2018008601 Machine Translation, Takahashi, Shingo (Year: 2018).*
(Continued)

*Primary Examiner* — Robert C Dye
*Assistant Examiner* — Nicholas J Weiler
(74) *Attorney, Agent, or Firm* — Birch, Stewart, Kolasch & Birch, LLP

(57) ABSTRACT

A first land region is defined between a first main groove and a second main groove extending in a tyre circumferential direction. The first land region is provided with a first oblique groove and a second oblique groove. The first oblique groove extends obliquely with respect to a tyre axial direction from the first main groove to have an end portion terminating within the first land region. The second oblique groove extends obliquely with respect to the tyre axial direction from the second main groove to intersect with a middle groove portion of the first oblique groove and terminate there.

9 Claims, 9 Drawing Sheets

(52) U.S. Cl.
CPC ... *B60C 11/1369* (2013.01); *B60C 2011/0358* (2013.01); *B60C 2011/0367* (2013.01); *B60C 2011/0369* (2013.01); *B60C 2011/0383* (2013.01); *B60C 2011/0388* (2013.01); *B60C 2011/1209* (2013.01); *B60C 2011/1213* (2013.01)

(56) References Cited

U.S. PATENT DOCUMENTS

| | | | |
|---|---|---|---|
| D579,855 S * | 11/2008 | Fontaine | D12/521 |
| 2009/0151833 A1* | 6/2009 | Sakai | B60C 11/12 |
| | | | 152/209.25 |
| 2010/0154952 A1* | 6/2010 | Kageyama | B60C 11/12 |
| | | | 152/209.18 |
| 2010/0252159 A1* | 10/2010 | Mukai | B60C 11/1369 |
| | | | 152/209.25 |
| 2013/0240100 A1 | 9/2013 | Miyoshi et al. | |
| 2014/0238566 A1 | 8/2014 | Takahashi et al. | |
| 2016/0152092 A1* | 6/2016 | Sasaki | B60C 11/0304 |
| | | | 152/209.18 |
| 2017/0232800 A1* | 8/2017 | Kanematsu | B60C 11/04 |
| | | | 152/209.18 |
| 2019/0176531 A1* | 6/2019 | Murata | B60C 11/1204 |

FOREIGN PATENT DOCUMENTS

| | | | | |
|---|---|---|---|---|
| EP | 2058144 A1 | | 5/2009 | |
| EP | 3081397 A1 | * | 10/2016 | ......... B60C 11/0302 |
| JP | 2003-211921 A | | 7/2003 | |
| JP | 2003-326918 A | | 11/2003 | |
| JP | 2011-68324 A | | 4/2011 | |
| JP | 2014-065328 A | | 4/2014 | |
| JP | 2018008601 A | * | 1/2018 | |
| WO | WO 2009/034912 A1 | | 3/2009 | |

OTHER PUBLICATIONS

Extended European Search Report dated Jun. 18, 2019, for corresponding European Patent Application No. 19161356.1.

* cited by examiner

TYRE

TECHNICAL FIELD

The present invention relates to a tyre capable of exerting both on-ice/on-snow performance and steering stability.

BACKGROUND ART

Conventionally, in a winter tyre, in order to ensure the on-ice/on-snow performance, a tread portion is divided into a plurality of blocks by a plurality of main grooves extending in a tyre circumferential direction and lateral grooves crossing between the main grooves, and a plurality of sipes are formed in each of the blocks. And for this on-ice/on-snow performance, it has been known that increasing snow shearing force by increasing groove volume of the main grooves and the lateral grooves and increasing edge components by increasing the number of the sipes formed are preferred.

However, there is a trade-off relationship between the on-ice/on-snow performance and the steering stability such as an increase in the groove volume and an increase in the number of sipes formed lead to a decrease in pattern rigidity, which decreases the steering stability on a dry road surface (may be referred to as dry steering stability).

Note that Japanese unexamined Patent Application Publication No. 2014-65328 (Patent Literature 1) has proposed a pneumatic tyre provided with a rib extending continuously in the tyre circumferential direction at a center in a tyre width direction and sipes each having a raised bottom and sipes not having the raised bottom formed on a surface of the rib.

By this configuration, it is possible that edge effect is obtained by the sipes having the raised bottoms while suppressing significant decrease in rigidity of the rib. Further, regions defined between the sipes without the raised bottom move as pseudo blocks, therefore, the edge effect is increased, and ground contacting surfaces are optimized, therefore, steering stability performance on a dry road surface is improved.

SUMMARY OF THE INVENTION

However, a demand for tyres is increasing year by year, and further improvement is required.

The present invention was made in view of the above, and a primary object thereof is to provide a tyre capable of exerting both the on-ice/on-snow performance and the steering stability at a high level.

In one aspect of the present invention, a tyre comprises a tread portion comprising a plurality of main grooves extending in a tyre circumferential direction and a plurality of land regions divided by the plurality of the main grooves, wherein the plurality of the main grooves includes a first main groove and a second main groove adjacent to each other in a tyre axial direction, the plurality of the land regions includes a first land region defined between the first main groove and the second main groove, the first land region is provided with a first oblique groove and a second oblique groove, the first oblique groove extends obliquely with respect to the tyre axial direction from the first main groove to have an end portion terminating within the first land region, and the second oblique groove extends obliquely with respect to the tyre axial direction from the second main groove to intersect with a middle groove portion of the first oblique groove and terminate there.

In another aspect of the invention, it is preferred that an inclination direction of the first oblique groove is opposite to an inclination direction of the second oblique groove.

In another aspect of the invention, it is preferred that a length (L1) in the tyre axial direction of the first oblique groove from the first main groove is in a range of from 60% to 80% of a land region width (W11) in the tyre axial direction of the first land region, and a length (L2) in the tyre axial direction of the second oblique groove from the second main groove is in a range of from 40% to 55% of the land region width (W11).

In another aspect of the invention, it is preferred that the first land region is provided with a bent sipe formed in an L-shape including a first sipe part and a second sipe part, the first sipe part extends from the first oblique groove, and the second sipe part is connected with an end portion of the first sipe part in a bent manner and extends therefrom to the first main groove.

In another aspect of the invention, it is preferred that the bent sipe surrounds a corner on an obtuse angle side sandwiched between the first oblique groove and the first main groove.

In another aspect of the invention, it is preferred that the first sipe part extends along the second oblique groove and the second sipe part extends along the first oblique groove.

In another aspect of the invention, it is preferred that the first oblique groove includes an intersection portion intersecting with the second oblique groove and an extension portion extending between the intersection portion and the end portion of the first oblique groove, and the first land region is provided with a short sipe extending from the second main groove toward the extension portion and terminating without intersecting with the extension portion.

In another aspect of the invention, it is preferred that the short sipe extends along the second oblique groove.

In another aspect of the invention, it is preferred that the first oblique groove at least includes a deep groove portion extending from the first main groove and a shallow groove portion connected with the deep groove portion with a gradually decreasing depth portion therebetween, and the second oblique groove intersects with the shallow groove portion with a depth equal to that of the shallow groove portion.

In another aspect of the invention, it is preferred that in the bent sipe, a depth (Ds1) of a first sipe portion is smaller than a depth (Ds2) of a second sipe portion.

In this specification, the term "sipe" means an incision in which at least a part of sipe wall surfaces thereof can contact each other at the time of contacting the ground, and preferably having a width of less than 1.5 mm.

In the tyre of the present invention, the first land region is divided into a plurality of blocks by the first oblique grooves extending obliquely with respect to the tyre axial direction from the first main groove and the second oblique grooves extending obliquely with respect to the tyre axial direction from the second main groove and by each of the first oblique grooves intersecting with a respective one of the second oblique grooves.

In the blocks configured as such, each of the first and the second oblique grooves has an end portion terminating within the first land region and the inclination directions of the first and the second oblique grooves are different from each other, therefore, it is possible that the pattern rigidity is increased as compared with blocks divided by ordinary lateral grooves.

DESCRIPTION OF THE PREFERRED EMBODIMENT

An embodiment of the present invention will now be described below in detail in conjunction with accompanying drawings.

Figure 1:
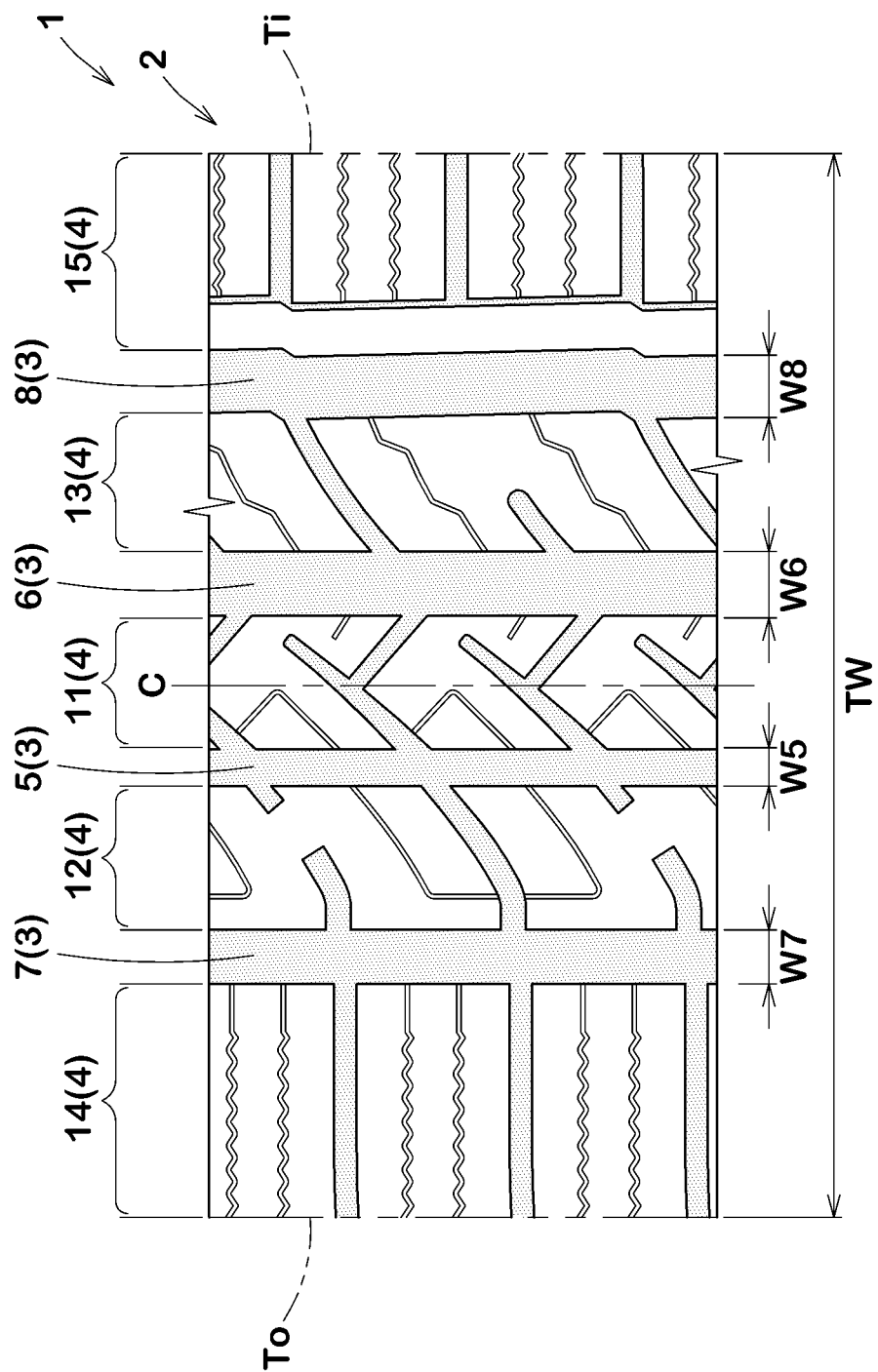
FIG. 1 is a development view of a tread portion of a tyre as an embodiment of the present invention.

FIG. 1 is a development view of a tread portion 2 of a tyre 1 showing an embodiment of the present invention. The tyre 1 in this embodiment can be used for various tyres such as a pneumatic tyre for a passenger car and for heavy load, and a non-pneumatic tyre not filled with pressurized air therein, for example. The tyre 1 in this embodiment is suitably used as a pneumatic tyre for a passenger car.

As shown in FIG. 1, the tyre 1 in this embodiment has the tread portion 2 whose position when mounted on a vehicle is specified. The tread portion 2 has an outer tread edge (To) and an inner tread edge (Ti). When the tyre 1 is mounted on a vehicle, the outer tread edge (To) is positioned on an outer side of the vehicle and the inner tread edge (Ti) is positioned on an inner side of the vehicle. The mounting position of the tyre 1 on a vehicle is indicated by letters or a symbol on at least one of sidewall portions (not shown), for example.

In a case of a pneumatic tyre, the tread edges (To) and (Ti) are defined as outermost ground contacting positions in a tyre axial direction of the tyre 1 when the tyre 1 in a standard state is in contact with a flat surface with zero camber angle by being loaded with a standard tyre load. Here, the "standard state" is a state in which the tyre 1 is mounted on a standard rim, inflated to a standard inner pressure, and loaded with no tyre load. Hereinafter, dimensions and the like of various parts of the tyre 1 are those measured under the standard state, unless otherwise noted.

The "standard rim" is a wheel rim specified for the concerned tyre by a standard included in a standardization system on which the tyre is based, for example, the "normal wheel rim" in JATMA, "Design Rim" in TRA, and "Measuring Rim" in ETRTO.

The "standard inner pressure" is air pressure specified for the concerned tyre by a standard included in a standardization system on which the tyre is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "standard tyre load" is a tyre load specified for the concerned tyre by a standard included in a standardization system on which the tyre is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

The tread portion 2 in this embodiment has a plurality of main grooves 3 each extending in the tyre circumferential direction and a plurality of land regions 4 divided by the plurality of the main grooves 3.

The plurality of the main grooves 3 includes a first main groove 5 and a second main groove 6 adjacent to each other in the tyre axial direction. In this embodiment, the first main groove 5 is configured to be an outer crown main groove positioned, when the tyre 1 is mounted on a vehicle, on the outer side of the vehicle of a tyre equator (C) and the second main groove 6 is configured to be an inner crown main groove positioned on the inner side of the vehicle of the tyre equator (C).

The plurality of the main grooves 3 further includes a third main groove 7 positioned, when the tyre 1 is mounted on a vehicle, on the outer side of the vehicle of the first main groove 5 and a fourth main groove 8 positioned on the inner side of the vehicle of the second main groove 6. The third main groove 7 is configured to be an outer shoulder main groove and the fourth main groove 8 is configured to be an inner shoulder main groove.

Although not particularly limited, it is preferred that a groove width W5 of the first main groove 5, a groove width W6 of the second main groove 6, a groove width W7 of the third main groove 7, a groove width W8 of the fourth main groove 8 satisfy the following relation: W5<W7<W8<W6.

A shape of a ground contacting surface of a tyre has a long ground contacting length in a region on a side of the inner tread edge (Ti) due to an influence of a camber when the tyre is mounted on a vehicle. Thereby, by making the groove widths W5 and W7 relatively small and the groove widths W6 and W8 relatively large, it is possible that groove volume is sufficiently secured in the region in which the ground contacting length is long, therefore, it is possible that high wet performance is exerted. Further, in the second main groove 6 and the fourth main groove 8, by making the groove width of the second main groove 6 positioned on the sided of the tyre equator (C) to which larger ground contact pressure is applied larger than the groove width of the fourth main groove 8, it is possible that the wet performance is further improved. Furthermore, by making the groove width W5 of the first main groove 5 smallest, decrease of ground contacting area on the side of the tyre equator due to making the groove width W6 of the second main groove 6 largest is suppressed, it becomes balanced with the steering stability.

It is preferred that the groove width W5 is in a range of from 2% to 4% of a tread width TW, that the groove width W6 is in a range of from 5% to 7% of the tread width TW, that the groove width W7 is in a range of from 4% to 6% of the tread width TW, and that the groove width W8 is in a range of from 5% to 7% of the tread width TW. The tread width TW is a distance between the outer tread edge (To) and the inner tread edge (Ti) in the tyre axial direction.

It is preferred that the first main groove 5, the second main groove 6, the third main groove 7, and the fourth main groove 8 have an equal depth to each other. It is possible that this main groove depth D3 (shown in FIG. 3) is appropriately set in accordance with customary practice.

Next, the plurality of the land regions 4 includes a first land region 11 defined between the first main groove 5 and the second main groove 6. The plurality of the land regions 4 further includes a second land region 12 defined between the first main groove 5 and the third main groove 7, a third land region 13 defined between the second main groove 6 and the fourth main groove 8, a fourth land region 14 defined between the third main groove 7 and the outer tread edge (To), and a fifth land region 15 defined between the fourth main groove 8 and the inner tread edge (Ti).

In this embodiment, the first land region 11 is configured to be a crown land region extending on the tyre equator (c). The second land region 12 is configured to be an outer middle land region. The third land region 13 is configured to be an inner middle land region. The fourth land region 14 is configured to be an outer shoulder land region. The fifth land region 15 is configured to be an inner shoulder land region.

Figure 2:
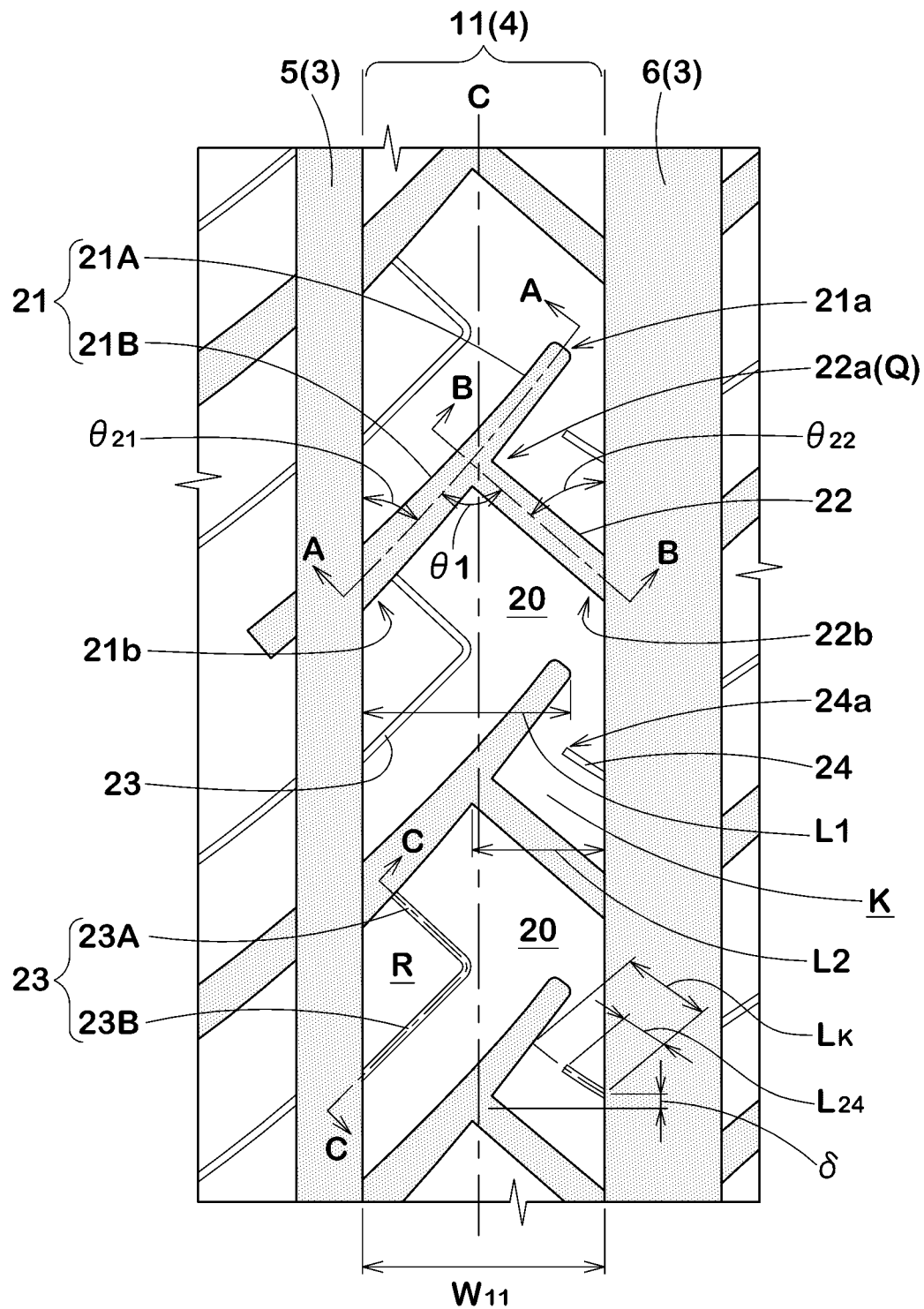
FIG. 2 is an enlarged view of a first land region.

FIG. 2 is an enlarged view of the first land region (crown land region) 11. As shown in FIG. 2, the first land region 11 in this embodiment is provided with a plurality of first oblique grooves 21 and a plurality of second oblique grooves 22.

Each of the first oblique grooves 21 extends from the first main groove 5 obliquely with respect to the tyre axial direction. An end portion (21*a*) of each of the first oblique grooves 21 terminates within the first land region 11.

Each of the second oblique grooves 22 extends from the second main groove 6 obliquely with respect to the tyre axial direction. An end portion (22*a*) of each of the second oblique grooves 22 intersects with a middle groove portion of a respective one of the first oblique grooves 21 and terminates there. The middle groove portion means a portion excluding both end portions of each of the first oblique grooves 21 in a longitudinal direction thereof. The both end portions of each of the first oblique grooves 21 are a connection portion (21*b*) with the first main groove 5 and the end portion (21*a*). Thereby, each of the first oblique grooves 21 is composed of an extension portion 21A positioned between an intersection portion (Q) intersecting with a respective one of the second oblique grooves 22 and an oblique groove main body 21B positioned between the intersection portion (Q) and the connection portion (21*b*).

In this embodiment, the first oblique grooves 21 have an inclination direction opposite to that of the second oblique grooves 22, thereby, the first land region 11 is divided into a plurality of blocks 20 each having a substantially v-shape.

It is possible that the substantially v-shaped blocks 20 configured as such obtain high pattern rigidity as compared with substantially rectangular blocks divided by ordinary lateral grooves. Moreover, by the inclination of the first oblique grooves 21 and the second oblique grooves 22 and the provision of the extension portion 21A in the first oblique grooves 21, it is possible that the groove volume and the edge components are increased, therefore, it is possible that the snow shearing force and the edge effect are increased. And by this interaction, it is possible that both the on-ice/on-snow performance and the steering stability are exerted at a high level.

In order to ensure the high pattern rigidity, an intersection angle θ1 between each of the first oblique grooves 21 and a respective one of the second oblique grooves 22 is preferably 90 degrees or less, and in particular in a range of from 80 to 90 degrees. Further, it is preferred that an angle θ21 with respect to the tyre circumferential direction of each of the first oblique grooves 21 is in a range of from 45 to 55 degrees and that an angle θ22 with respect to the tyre circumferential direction of each of the second oblique grooves is in a range of from 45 to 55 degrees. When the intersection angle θ1 and the angles θ21 and θ22 are out of the above ranges, the effect of improving the pattern rigidity tends to be decreased.

It is preferred that a length L1 in the tyre axial direction of each of the first oblique grooves 21 from the first main groove 5 is in a range of from 60% to 80% of a land region width W11 of the first land region 11. When the length L1 is more than 80% of the land region width W11, the pattern rigidity is decreased, which is disadvantageous in the steering stability. Conversely, when the length L1 is less than 60%, the groove volume and the edge components are decreased, which is disadvantageous in the on-ice/on-snow performance.

It is preferred that a length L2 in the tyre axial direction of each of the second oblique grooves 22 from the second main groove 6 is in a range of from 40% to 55% of the land region width W11. When the length L2 is out of the above range, the pattern rigidity becomes imbalanced on the left and right, which is disadvantageous in the steering stability.

Figure 3A:
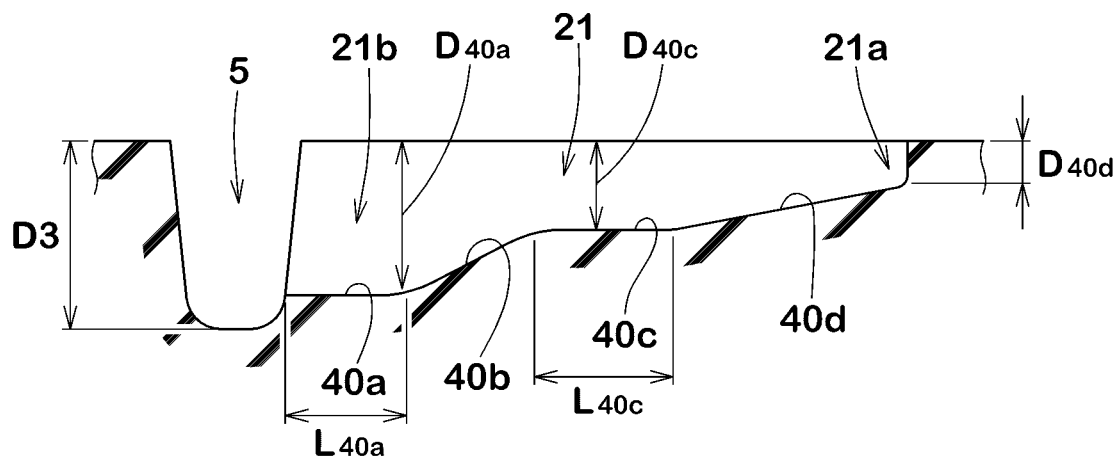
FIG. 3A is a cross-sectional view of one of first oblique grooves taken along A-A line.
Figure 3B:
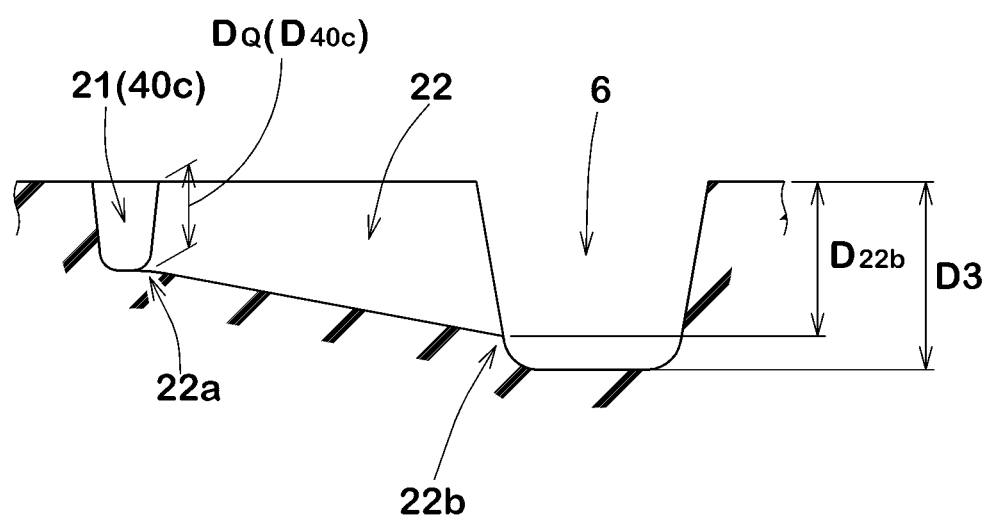
FIG. 3B is a cross-sectional view of one of second oblique grooves taken along B-B line.

FIG. 3A is a cross-sectional view of one of the first oblique grooves 21 taken along A-A line of FIG. 2, and FIG. 3B is a cross-sectional view of one of the second oblique grooves 22 taken along B-B line of FIG. 2. As shown in FIG. 3A, each of the first oblique grooves 21 has a deep groove portion (40*a*) extending from the first main groove 5, a shallow groove portion (40*c*) connected with the deep groove portion (40*a*) with a gradually decreasing depth portion (40*b*) therebetween, and a gradually decreasing depth portion (40*d*) extending so as to connect between the shallow groove portion (40*c*) and the end portion (21*a*).

The deep groove portion (40*a*) has a constant groove depth (D40*a*) and the shallow groove portion (40*c*) has a constant groove depth (D40*c*) smaller than the groove depth (D40*a*). Further, each of the gradually decreasing depth portions (40*b*) and (40*d*) extends with the groove depth thereof gradually decreasing toward the inner tread edge (Ti).

By changing the groove depth in each of the first oblique grooves 21 as just described above, as compared with a case in which the groove depth is averaged, it is possible that the high pattern rigidity is secured. In particular, by making the groove depth smaller as it goes toward the inner tread edge (Ti) where the ground contacting length becomes longer, it is possible that the pattern rigidity of the first land region 11 is further increased.

It is preferred that the groove depth (D40*a*) of the deep groove portion (40*a*) is in a range of from 80% to 90% of the main groove depth D3. It is preferred that the groove depth (D40*c*) of the shallow groove portion (40*c*) is in a range of from 40% to 50% of the main groove depth D3. Further, it is preferred that a groove depth (D40*d*) of each of the first oblique grooves 21 at the end portion (21*a*) thereof is in a range of from 20% to 30% of the main groove depth D3. Note that it is preferred that a length (L40*a*) of the deep groove portion (40*a*) along a length direction of the respective first oblique groove 21 is in a range of from 0.9 to 1.1 times a length (L40*c*) of the shallow groove portion (40*c*).

As shown in FIG. 3B, each of the second oblique grooves 22 in this embodiment extends with a groove width gradually decreasing from the second main groove 6. Note that the groove depth may be constant. Each of the second oblique grooves 22 intersects with the shallow groove portion (40*c*) of a respective one of the first oblique grooves 21. A groove depth DQ of each of the second oblique grooves 22 at the intersection portion (Q) thereof is equal to the groove depth (D40*c*) of the shallow groove portion (40*c*). Further, it is preferred that a groove depth (D22*b*) of a connection portion (22*b*) of each of the second oblique grooves 22 with the second main groove 6 is in a range of from 40% to 75% of the main groove depth D3.

As shown in FIG. 2, the first land region 11 is provided with L-shaped bent sipes 23 and short sipes 24.

Each of the bent sipes 23 is formed in an L-shape including a first sipe part 23A extending from a respective one of the first oblique grooves 21 and a second sipe part 23B connected with one end portion of the first sipe part 23A in a bent manner and extends therefrom to the first main groove 5.

It is preferred that the first sipe part 23A extends substantially in parallel with the second oblique grooves 22. Further, it is preferred that the second sipe part 23B extends substantially in parallel with the first oblique grooves 21. The expression "substantially in parallel" includes embodiments in which they are parallel and in which they are inclined at an angle within ±5 degrees with respect to parallel. Further, each of the bent sipes 23 is arranged so as to surround a corner (R) on an obtuse angle side sandwiched between a respective one of the first oblique grooves 21 and the first main groove 5.

Figure 4:
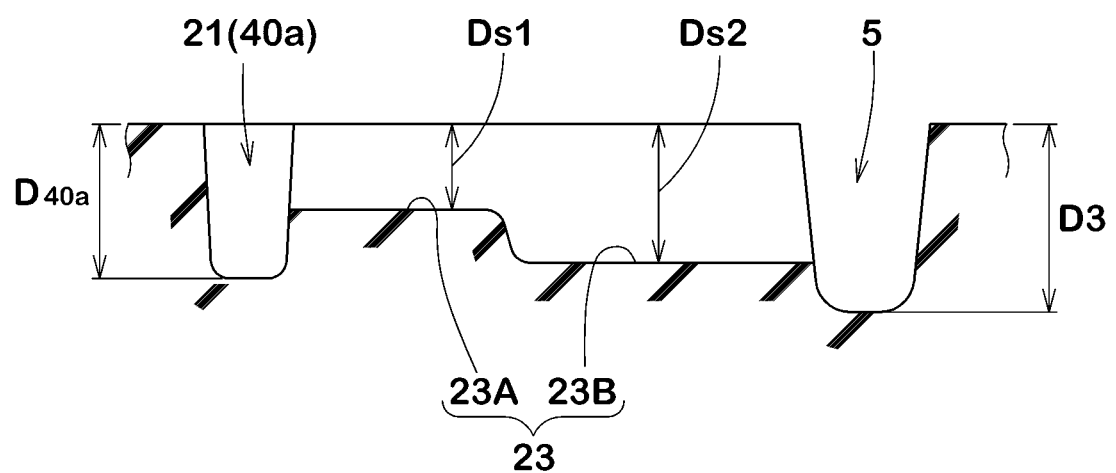
FIG. 4. is a cross-sectional view of one of bent sipes taken along C-C line.

FIG. 4. is a cross-sectional view of one of the bent sipes 23 taken along C-C line of FIG. 2. As shown in FIG. 4, it is preferred that a depth (Ds1) of the first sipe part 23A is smaller than a depth (Ds2) of the second sipe part 23B. In particular, it is preferred that the depth (Ds1) is in a range of from 40% to 50% of the main groove depth D3 and that depth (Ds2) is in a range of from 70% to 80% of the main groove depth D3.

The bent sipes 23 are bent in the L-shape, therefore, the edge components are increased, thereby, it is possible that they contribute to improvement of the on-ice/on-snow performance. Further, the depth (Ds1) of the first sipe part 23A which intersects with a respective one of the first oblique grooves 21 is relatively small, therefore, it is possible that the decrease of the pattern rigidity is suppressed. Furthermore, each of the bent sipes 23 is formed so as to surround a respective one of the corners (R) on the obtuse angle side which is difficult to be deformed, therefore, it is possible that the decrease of the pattern rigidity is further suppressed.

Further, each of the short sipes 24 extends from the second main groove 6 to a respective one of the extension portions 21A. One end portion (24a) of each of the short sipes 24 terminates without intersecting with a respective one of the extension portions 21A.

Specifically, each of the short sipes 24 is arranged in a region (K) surrounded by the second main groove 6, a respective one of the second oblique grooves 22, and a respective one of the extension portions 21A. Further, a distance S in the tyre circumferential direction between a connection portion of each of the short sipes 24 and the second main groove 6 and a respective one of the intersection portions (Q) is preferably 5 mm or less, and more preferably 3 mm or less. The short sipes 24 have the one end portions (24a) terminating within the regions (K), therefore, the edge components are increased while the decrease of the pattern rigidity is suppressed, thereby, it is possible that they contribute to the improvement of the on-ice/on-snow performance. It is preferred that the short sipes 24 extend in parallel with the second oblique grooves 22. The expression "substantially in parallel" includes embodiments in which they are parallel and in which they are inclined at an angle within ±5 degrees with respect to parallel.

From a point of view of a balance between the pattern rigidity and the edge components, it is preferred that a depth D24 (not shown) of each of the short sipes 24 is in a range of from 40% to 50% of the main groove depth D3. Further, it is preferred that a length L24 of each of the short sipes 24 is in a range of from 50% to 60% of a length LK measured in a length direction line of the respective short sipe 24 between the connection portion thereof and a respective one of the extension portions 21A.

Figure 5:
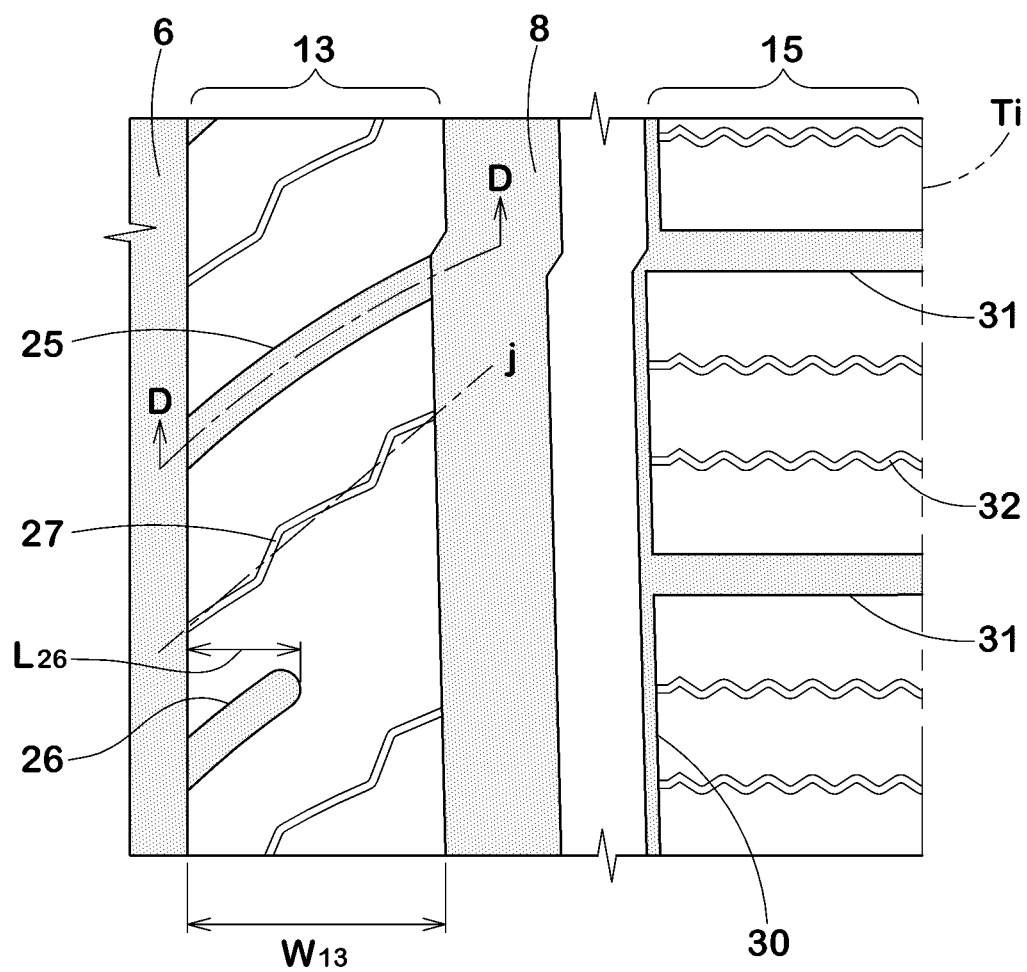
FIG. 5 is an enlarged view of a third land region and a fifth land region.

FIG. 5 shows a third land region (an inner middle land region) 13 and a fifth land region (an inner shoulder land region) 15.

The third land region (inner middle land region) 13 in this embodiment is provided with middle lateral grooves 25, middle short grooves 26, and middle sipes 27. Each of the middle lateral grooves 25 extends so as to connect between the second main groove 6 and the fourth main groove 8 and is inclined with respect to the tyre axial direction. It is preferred that an inclination direction of the middle lateral grooves 25 is the same as the inclination direction of the first oblique grooves 21.

Figure 6:
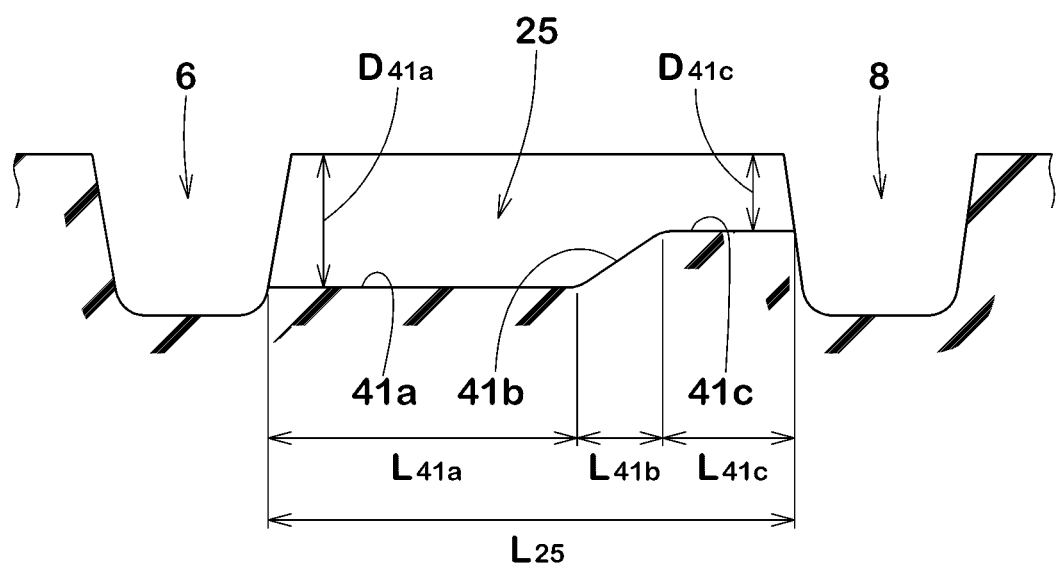
FIG. 6 is a cross-sectional view of one of middle lateral grooves taken along D-D line.

FIG. 6 is a cross-sectional view of one of the middle lateral grooves 25 taken along D-D line of FIG. 5. As shown in FIG. 6, each of the middle lateral grooves 25 has a deep groove portion (41a) extending from the second main groove 6, and a shallow groove portion (41c) connected with the deep groove portion (41a) with a gradually decreasing depth portion (41b) therebetween.

The deep groove portion (41a) has a constant groove depth (D41a) and the shallow groove portion (41c) has a constant groove depth (D41c) smaller than the groove depth (D41a). The gradually decreasing depth portions (41b) extends with a groove depth thereof gradually decreasing toward the inner tread edge (Ti).

By changing the groove depth in each of the middle lateral grooves 25 as just described above, as compared with a case in which the groove depth is averaged, it is possible that the high pattern rigidity is secured. In particular, by making the groove depth smaller as it goes toward the inner tread edge (Ti) where the ground contacting length becomes longer, it is possible that the pattern rigidity of the third land region 13 is further increased.

It is preferred that the groove depth (D41a) of the deep groove portion (41a) is in a range of from 80% to 90% of the main groove depth D3, and in particular, it is preferred that the groove depth (D41a) is equal to the groove depth (D40a) of the deep groove portion (40a) of each of the first oblique grooves 21. It is preferred that the groove depth (D41c) of the shallow groove portion (41c) is in a range of from 40% to 50% of the main groove depth D3, and in particular, it is preferred that the groove depth (D41c) is equal to the groove depth (D40c) of the shallow groove portion (40c) of each of the first oblique grooves 21. It is preferred that a length (L41a) of the deep groove portion (41a) of each of the middle lateral grooves 25 along a length direction thereof is equal to or more than a sum (L41b+L41c) of a length (L41b) of the gradually decreasing depth portions (41b) and a length (L41c) of the shallow groove portion (41c). In particular, it is preferred that the length (L41a) is in a range of from 55% to 60% of a total length L25 of each of the middle lateral grooves 25, it is preferred that the length (L41b) is in a range of from 15% to 20% of the total length L25, and it is preferred that the length (L41c) is in a range of from 25% to 30% of the total length L25.

As shown in FIG. 5, each if the middle short grooves 26 extends from the second main groove 6 obliquely with respect to the tyre axial direction to have one end portion terminating within the third land region 13. It is preferred that an inclination direction of the middle short grooves 26 is the same as the inclination direction of the middle lateral grooves 25, and in particular, it is preferred that they extend substantially in parallel with each other. The expression "substantially in parallel" includes embodiments in which they are parallel and in which they are inclined at an angle within ±5 degrees with respect to parallel. The middle short grooves 26 have one end portions each terminating within the third land region 13, therefore, the edge components are increased while the decrease of the pattern rigidity of the third land region 13 is suppressed, thereby, it is possible that they contribute to the improvement of the on-ice/on-snow performance.

From the point of view of the balance between the pattern rigidity and the edge components, it is preferred that a groove depth D26 (not shown) of each of the middle short grooves 26 is in a range of from 70% to 80% of the main groove depth D3. Further, a length L26 in a tyre width direction of each of the middle short grooves 26 is preferably 50% or less, more preferably in a range of from 40% to 50% of a land region width W13 of the third land region 13.

The middle lateral grooves 25 and the middle short grooves 26 are arranged alternately in the tyre circumferential direction. Further, each of the middle sipes 27 is arranged between a respective one of pairs of the middle lateral groove 25 and the middle short groove 26 adjacent to each other in the tyre circumferential direction.

Each of the middle sipes 27 extends obliquely with respect to the tyre axial direction so as to connect between the second main groove 6 and the fourth main groove 8. It is preferred that an inclination direction of the middle sipes 27 is same as the inclination direction of the middle lateral grooves 25, and in particular, it is preferred that they extend substantially in parallel with each other. The expression "substantially in parallel" includes embodiments in which they are parallel and in which they are inclined at an angle within ±5 degrees with respect to parallel. In this embodiment, a case is shown in which each of the middle sipes 27 extends in a zigzag shape in a length direction thereof. In this case, the inclination direction of each of the middle sipes 27 means an inclination direction of a center line (j) of the zigzag shape thereof. Further, the expression "the middle sipes 27 and the middle lateral grooves 25 are substantially in parallel" means that the center lines (j) of the zigzag shapes of the middle sipes 27 and the middle lateral grooves 25 are substantially in parallel.

Figure 7A:
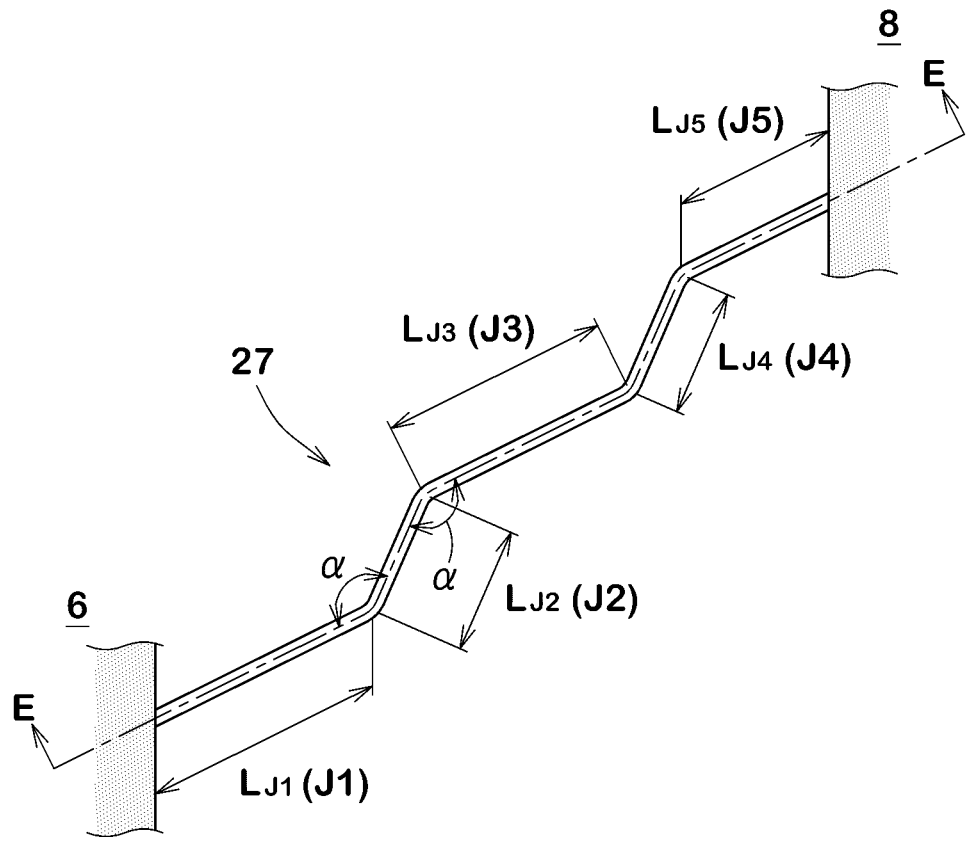
FIG. 7A is an enlarged view of one of middle sipes.

As shown in FIG. 7A, each of the zigzag-shaped middle sipes 27 in this embodiment is composed of zigzag elements J1 to J5 (collectively referred to as zigzag elements (J)) arranged from the second main groove 6 to the fourth main groove 8 in this order. An angles α between adjacent zigzag elements (J) are equal to each other. It is preferred that the angles α is larger than 90 degrees, and in particular, it is preferred that the angles α is in a range of from 130 to 150 degrees.

In lengths LJ1 to LJ5 of the respective zigzag elements 31 to 35 along a respective length direction, it is preferred that each of the lengths L71, LJ3, and LJ5 is larger than each of the lengths LJ2 and LJ4, and in particular, it is preferred that the length LJ2 is equal to the length LJ4.

Each of the zigzag-shaped middle sipes 27 configured as such has a plurality of inflection points, therefore, the edge components are increased. At this time, by making the angles α of the zigzag obtuse and by making the lengths LJ2 and LJ4 of the zigzag elements J2 and J4, which extend in the tyre circumferential direction, shorter, it is possible that the edge components are secured at a maximum level while pattern lateral rigidity having high effect on the steering stability is secured.

Figure 7B:
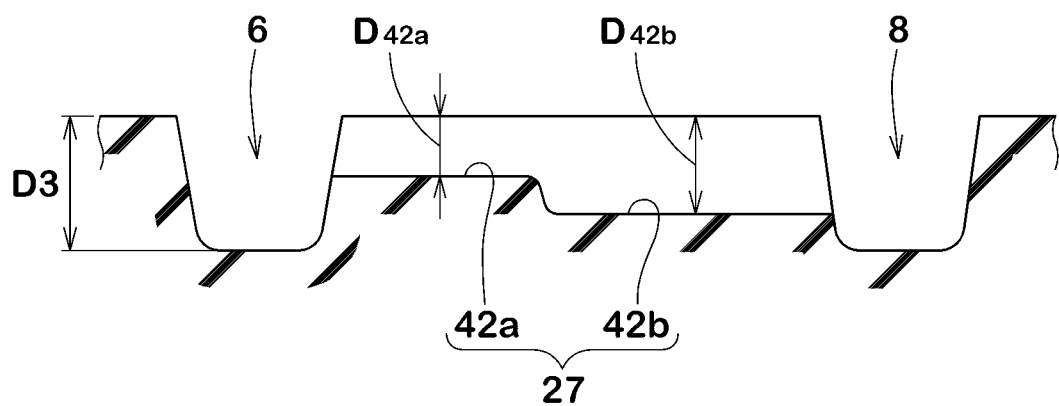
FIG. 7B is a cross-sectional view of one of the middle sipes taken along E-E line.

FIG. 7B is a cross-sectional view of one of the middle sipes 27 taken along E-E line of FIG. 7A. As shown in FIG. 78, each of the middle sipes 27 is provided with a shallow groove portion (42a) extending from the second main groove 6 and a deep groove portion (42b) extending so as to connect between the shallow groove portion (42a) and the fourth main groove 8. The shallow groove portion (42a) has a constant groove depth (D42a) and the deep groove portion (42b) had a constant groove depth (D42b) larger than the groove depth (D42a). The zigzag elements J1 and J2 form the shallow groove portion (42a) and the zigzag elements J3, J4, and J5 form the deep groove portion (42b). It is preferred that the groove depth (D42a) of the shallow groove portion (42a) is in a range of from 40% to 50% of the main groove depth D3. It is preferred that the groove depth (D42b) of the deep groove portion (42b) is in a range of from 70% to 80% of the main groove depth D3. In particular, in this embodiment, the depth (Ds1), the depth D24, and the groove depth (D42b) are set to be equal, further, the depth (Ds2) and the groove depth (D42b) are set to be equal.

In the middle sipes 27, by arranging the deep groove portions (42b) on a side of the inner tread edge (Ti), the pattern rigidity is suppressed from becoming unbalanced due to arranging the middle short grooves 26 on a side of the outer tread edge (To).

As shown in FIG. 5, the fifth land region 15 is provided with a shoulder narrow groove 30 extending along the fourth main groove 8, a plurality of shoulder lateral grooves 31 and a plurality of shoulder sipes 32 each extending so as to connect between the shoulder narrow groove 30 and the inner tread edge (Ti).

Figure 8:
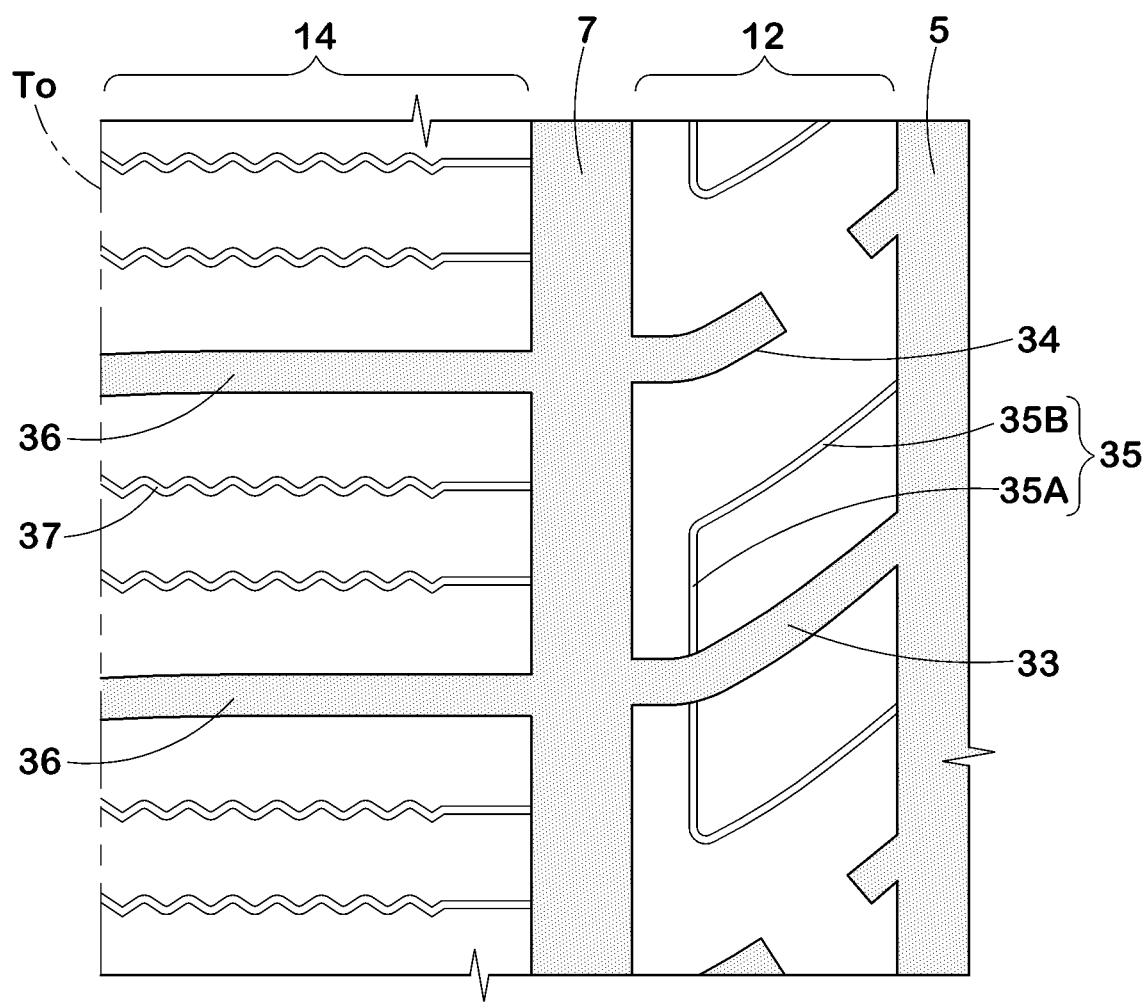
FIG. 8 is an enlarged view of a second land region and a fourth land region.

FIG. 8 shows the second land region (outer middle land region) 12 and the fourth land region (outer shoulder land region) 14.

The second land region (outer middle land region) 12 in this embodiment is provided with middle lateral grooves 33, middle short grooves 34, and bent sipes 35.

Each of the middle lateral grooves 33 extends obliquely with respect to the tyre axial direction so as to connect between the third main groove 7 and the first main groove 5. It is preferred that an inclination direction of the middle lateral grooves 33 is same as an inclination direction of the first oblique grooves 21. In particular, each of the middle lateral grooves 33 in this embodiment is arranged so as to extend continuously with a respective one of the first oblique grooves 21 with the first main groove 5 therebetween.

Each of the middle short grooves 34 extends obliquely with respect to the tyre axial direction from the third main groove 7 to have an end portion terminating within the second land region 12. It is preferred that an inclination direction of the middle short grooves 34 is the same as an inclination direction of the middle lateral grooves 33. A groove structure such as groove depths of the middle lateral grooves 33 and the middle short grooves 34 is set in accordance with the groove structure of the middle lateral grooves 25 and the middle short grooves 26 provided in the third land region 13.

Each of the bent Sipes 35 is formed in an L-shape including a first sipe part 35A extending from a respective one of the middle lateral grooves 33 and a second sipe part 358 connected with one end portion of the first sipe part 35A in a bent manner and extends therefrom to the first main groove 5.

It is preferred that first sipe part 35A extend substantially in parallel with the first main groove 5. Further, it is preferred that the second sipe part 35B extend substantially in parallel with the middle lateral grooves 33. The expression "substantially in parallel" includes embodiments in which they are parallel and in which they are inclined at an angle within ±5 degrees with respect to parallel. A structure of the bent sipes 35 such as depths thereof is set in accordance with the structure of the bent sipes 23 provided in the first land region 11. Each of the second sipe parts 35B in this embodiment is arranged so as to extend continuously with the second sipe part 23B of a respective one of the bent sipes 23 with the first main groove 5 therebetween.

The fourth land region 14 is provided with a plurality of shoulder lateral grooves 36 and shoulder sipes 37 each extending so as to connect between the third main groove 7 and the outer tread edge (To). Each of the shoulder lateral grooves 36 in this embodiment is arranged so as to extend continuously with a respective one of the middle lateral grooves 33 or the middle short grooves 34 with the third main groove 7 therebetween.

Figure 9:
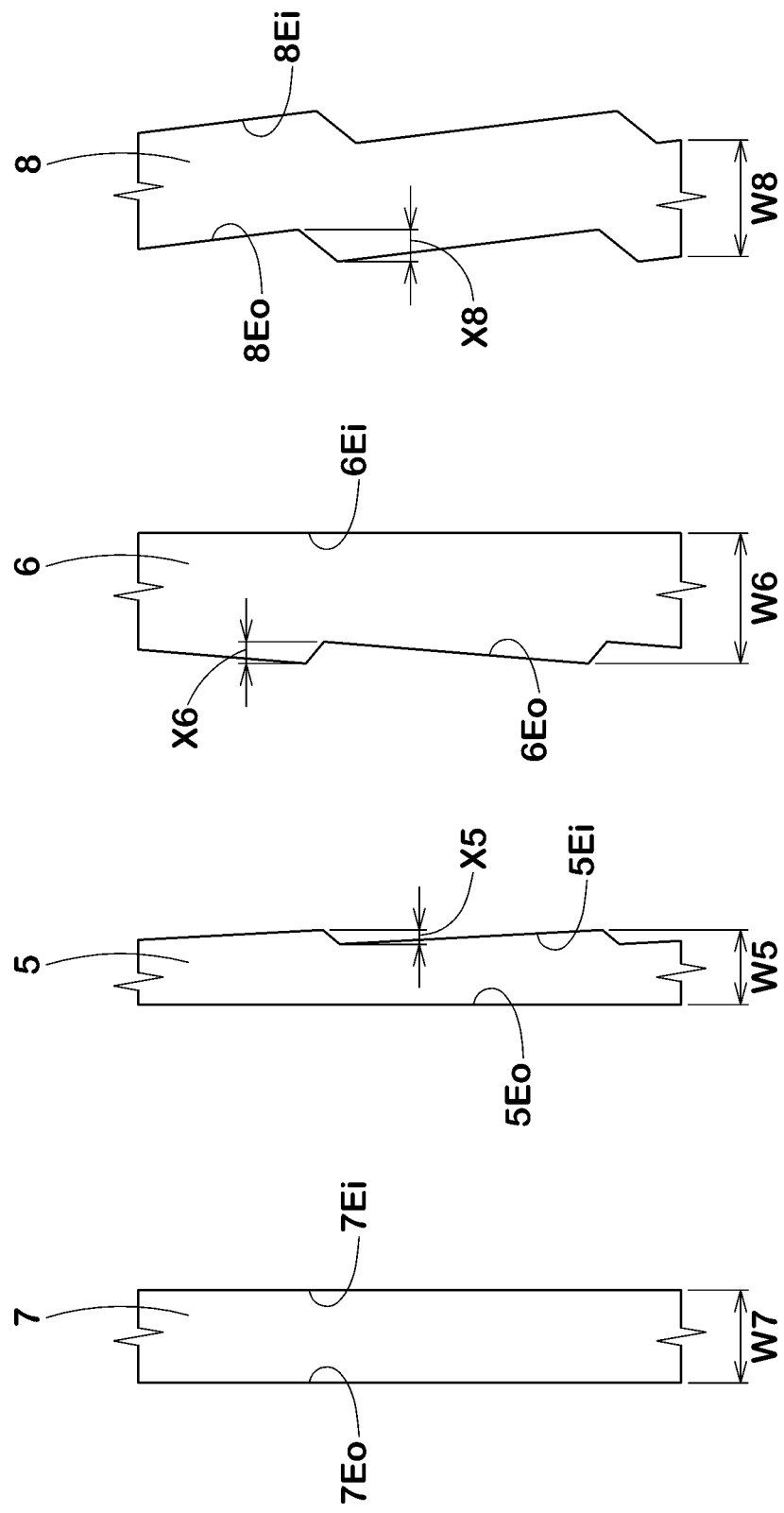
FIG. 9 is an enlarged view of a plan view exaggeratedly showing each of main grooves.

In FIG. 9, the first main groove 5, the second main groove 6, the third main groove 7, and the fourth main groove 8 are exaggeratedly shown.

As shown in FIG. 9, in the third main groove 7, each of groove side edges (7Ei) and (7Eo) on both sides extends linearly in the tyre circumferential direction. On the other hand, in the first main groove 5 which has groove side edges (5Ei) and (5Eo), the groove side edge (5Ei) on an inner side of the vehicle forming one of side edges of the first land region 11 extends in a sawtooth shape with a deflection amount (×5) in a width direction thereof. Thereby, the first main groove 5 extends in the tyre circumferential direction while increasing and decreasing a groove width thereof. In this case, a maximum width of the first main groove 5 is defined as the groove width W5 of the first main groove 5. Further, in the second main groove 6 which has groove side edges (6Ei) and (6Eo), the groove side edge (6Eo) on an outer side of the vehicle forming the other side edge of the first land region 11 extends in a sawtooth shape with a deflection amount (×6) in a width direction thereof. Thereby, the second main groove 6 also extends in the tyre circumferential direction while increasing and decreasing a groove width thereof. In this case, a maximum width of the second main groove 6 is defined as the groove width W6 of the second main groove 6. Furthermore, in the fourth main groove 8, each of groove side edges (8Ei) and (8Eo) on both sides extends in a sawtooth shape with a deflection amount (×8) in a width direction thereof. The groove side edges (8Ei) and (8Eo) are parallel with each other, therefore, the fourth main groove 8 extends in the tyre circumferential direction with the constant groove width W8.

As just described above, the main grooves 3 have the deflection amounts (×5), (×6), and (×8), therefore, it is possible that the edge components are increased. In particular, the first land region (crown land region) 11 is an important part in any of cornering, braking, and driving modes, therefore, by providing the deflection amount (×5) and (×6) in the groove side edges (5Ei) and (6Eo) forming the both side edges of this first land region 11, it is possible that the edge components are increased while decrease of drainage property is suppressed, thereby, which can contribute to the improvement of the on-ice/on-snow performance.

It is preferred that the deflection amounts (×5), (×6), and (×8) of the main grooves 3 satisfy the following relation: (×5)<(×6)<(×8). In particular, it is preferred that the deflection amount (×5) is in a range of from 10% to 12% of the groove width W5, that the deflection amount (×6) is in a range of from 7% to 9% of the groove width W6, and that the deflection amount (×8) is in a range of from 13% to 15% of the groove width W8.

While detailed description has been made of the tyres as especially preferred embodiment of the present invention, the present invention can be embodied in various forms without being limited to the embodiment described above.

WORKING EXAMPLES (EXAMPLES)

Tyres having the basic pattern shown in FIG. 1 were made by way of test according to the specifications listed in Table 1. Each of the test tyres was tested for the on-ice/on-snow performance, the steering stability performance, and the wet performance.

As Reference 1, the tyre disclosed in the Patent Literature 1 was adopted.

Common specifications of each of the test tyres and the test methods were as follows.

Tyre size: 215/60R16
Tyre rim size: 16×7.033
Tyre inner pressure: 250 kPa
Test vehicle: domestically produced mid-size passenger car (displacement of 2500 cc)
Tyre mounting position: all wheels
(1) On-Ice/On-Snow Performance While the test vehicle with the test tyres mounted on the wheels thereof was driven on an icy/snowy road surface of a test course by a driver, the steering stability performance was evaluated by the feeling of the driver. The test results are indicated by an index based on the Reference 1 being 100, wherein the larger the numerical value, the better the steering stability performance is.
(2) Steering Stability Performance While the test vehicle with the test tyres mounted on the wheels thereof was driven on a dry road surface of a test course by a driver, the steering stability performance was evaluated by the feeling of the driver. The test results are indicated by an index based on the Reference 1 being 100, wherein the larger the numerical value, the better the steering stability performance is.
(3) Wet Performance While the test vehicle with the test tyres mounted on the wheels thereof was driven on an asphalt road surface having a radius of 100 meters with a paddle having a depth of 5 mm and a length of 20 meters, lateral acceleration (lateral G) of the front wheels was measured and then an average lateral G at the time when the test vehicle was driven at a speed in a range of from 50 to 80 km/h was calculated. The test results are indicated by an index based on the Reference 1 being 100, wherein the larger the numerical value, the better the wet performance is.

TABLE 1

|  | Ref. 1 | Ex. 1 | Ex. 2 | Ex. 3 | Ex. 4 | Ex. 5 | Ex. 6 | Ex. 7 | Ex. 8 | Ref. 2 |
|---|---|---|---|---|---|---|---|---|---|---|
| <First land region> | | | | | | | | | | |
| First oblique groove | — | | | | | present | | | | |
| Extension portion | — | | | | | present | | | | absent |
| Length L1 (/W11) | — | 0.7 | | 0.8 | 0.6 | | | 0.7 | | 0.5 |
| Depth of Deep groove | — | | | | 0.85 | | | | 0.65 | 0.85 |

TABLE 1-continued

| | Ref. 1 | Ex. 1 | Ex. 2 | Ex. 3 | Ex. 4 | Ex. 5 | Ex. 6 | Ex. 7 | Ex. 8 | Ref. 2 |
|---|---|---|---|---|---|---|---|---|---|---|
| portion (/D3) | | | | | | | | | | |
| Depth of Shallow groove portion (/D3) | — | | | | 0.45 | | | | 0.65 | 0.45 |
| Second oblique groove | — | | | | | present | | | | |
| Length L2 (/W11) | — | | 0.5 | | 0.4 | 0.55 | | | 0.5 | |
| Relation between Inclination direction of First oblique groove | — | | | | opposite direction | | | | | |
| Intersection angle θ1 [degree] | — | | | | | 85 | | | | |
| Bent sipe | — | present | absent | | | | | present | | |
| Relation between Depths (Ds1) and (Ds2) | — | (Ds1) < (Ds2) | — | | (Ds1) < (Ds2) | | | (Ds1) = (Ds2) | (Ds1) < (Ds2) | |
| Short sipe | — | present | absent | | | | | absent | | |
| On-ice/on-snow performance | 100 | 120 | 115 | 123 | 115 | 115 | 123 | 120 | 120 | 110 |
| Steering stability performance | 100 | 120 | 120 | 118 | 123 | 123 | 118 | 118 | 117 | 125 |
| Wet performance | 100 | 120 | 115 | 123 | 115 | 115 | 123 | 120 | 120 | 110 |

From the test results, it was confirmed that the on-ice/on-snow performance and the steering stability were improved in a good balance at a high level for the tyres as Examples.

The invention claimed is:

1. A tyre comprising:
a tread portion comprising a plurality of main grooves extending in a tyre circumferential direction and a plurality of land regions divided by the plurality of main grooves, wherein
the plurality of main grooves includes a first main groove and a second main groove adjacent to each other in a tyre axial direction,
the plurality of land regions includes a first land region defined between the first main groove and the second main groove,
the first land region is provided with a plurality of first oblique grooves and a plurality of second oblique grooves,
the plurality of first oblique grooves extends obliquely with respect to the tyre axial direction from the first main groove to have end portions terminating within the first land region,
the plurality of second oblique grooves extends obliquely with respect to the tyre axial direction from the second main groove to intersect with middle groove portions of the respective first oblique grooves and terminate there,
an inclination direction of at least one of the first oblique grooves is opposite to an inclination direction of at least one of the second oblique grooves,
the at least one of the first oblique grooves is inclined in a first direction with respect to the tyre axial direction over an entire length thereof;
the at least one of the second oblique grooves is inclined in a second direction opposite to the first direction with respect to the tyre axial direction over an entire length thereof,
a length in the tyre axial direction of the at least one of the first oblique grooves from the first main groove to the end portion of the at least one of the first oblique grooves is in a range of from 60% to 80% of a land region width in the tyre axial direction of the first land region,
a length in the tyre axial direction of the at least one of the second oblique grooves from the second main groove is in a range of from 40% to 55% of the land region width,
the first land region is provided with a bent sipe formed in an L-shape including a first sipe part and a second sipe part,
the first sipe part extends from the at least one of the first oblique grooves, and
the second sipe part is connected with an end portion of the first sipe part in a bent manner and extends therefrom to the first main groove.

2. The tyre according to claim 1, wherein
the bent sipe surrounds a corner on an obtuse angle side sandwiched between the at least one of the first oblique grooves and the first main groove.

3. The tyre according to claim 1, wherein
the first sipe part extends along the at least one of the second oblique grooves and the second sipe part extends along the at least one of the first oblique grooves.

4. The tyre according to claim 1, wherein
the at least one of the first oblique grooves includes an intersection portion intersecting with the at least one of the second oblique grooves and an extension portion extending between the intersection portion and the end portion of the at least one of the first oblique grooves, and
the first land region is provided with a short sipe extending from the second main groove toward the extension portion and terminating without intersecting with the extension portion.

5. The tyre according to claim 4, wherein
the short sipe extends along the at least one of the second oblique grooves.

6. The tyre according to claim 1, wherein
the at least one of the first oblique grooves at least includes a deep groove portion extending from the first main groove and a shallow groove portion connected with the deep groove portion with a gradually decreasing depth portion therebetween, and
the at least one of the second oblique grooves intersects with the shallow groove portion with a depth equal to that of the shallow groove portion.

7. The tyre according to claim 1, wherein
in the bent sipe, a depth (Ds1) of the first sipe part is smaller than a depth (Ds2) of the second sipe part.

8. The tyre according to claim 1, wherein
a position of the tread portion when the tyre is mounted on a vehicle is specified, and the first land region is a crown land region extending on a tyre equator.

9. A tyre comprising:

a tread portion comprising a plurality of main grooves extending in a tyre circumferential direction and a plurality of land regions divided by the plurality of main grooves, wherein the plurality of main grooves includes a first main groove and a second main groove adjacent to each other in a tyre axial direction, the plurality of land regions includes a first land region defined between the first main groove and the second main groove, the first land region is provided with a plurality of first oblique grooves and a plurality of second oblique grooves, the plurality of first oblique grooves extends obliquely with respect to the tyre axial direction from the first main groove to have end portions terminating within the first land region, the plurality of second oblique grooves extends obliquely with respect to the tyre axial direction from the second main groove to intersect with middle groove portions of the respective first oblique grooves and terminate there, the first land region is provided with a bent sipe formed in an L-shape including a first sipe part and a second sipe part, the first sipe part extends from one of the first oblique grooves, the second sipe part is connected with an end portion of the first sipe part in a bent manner and extends therefrom to the first main groove, and the bent sipe surrounds a corner on an obtuse angle side sandwiched between the one of the first oblique grooves and the first main groove, wherein in a tread plan view, the corner has an obtuse angle of from 125 to 135 degrees.

* * * * *